UNITED STATES PATENT OFFICE.

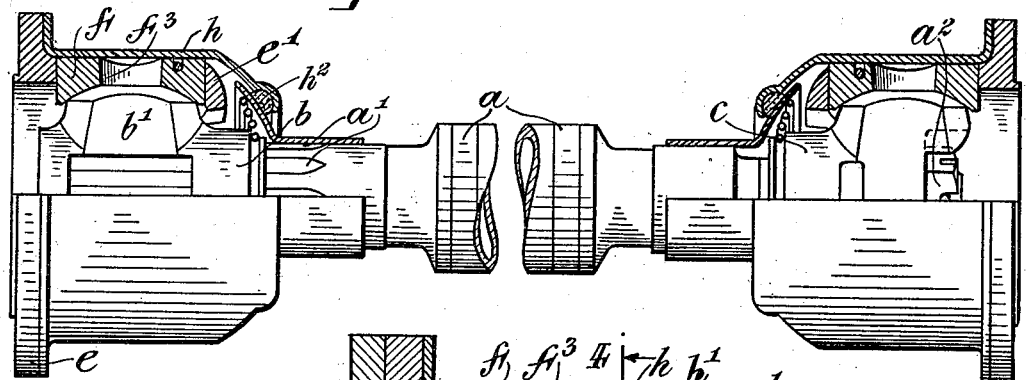
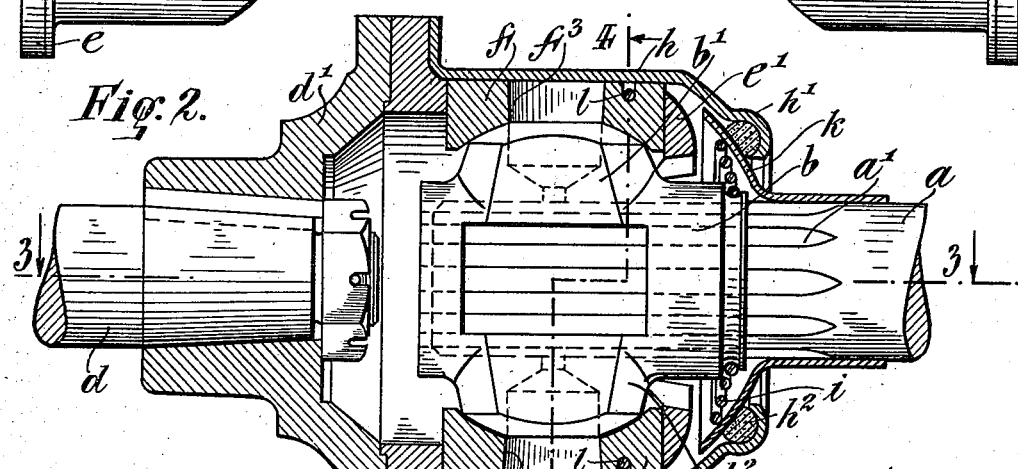
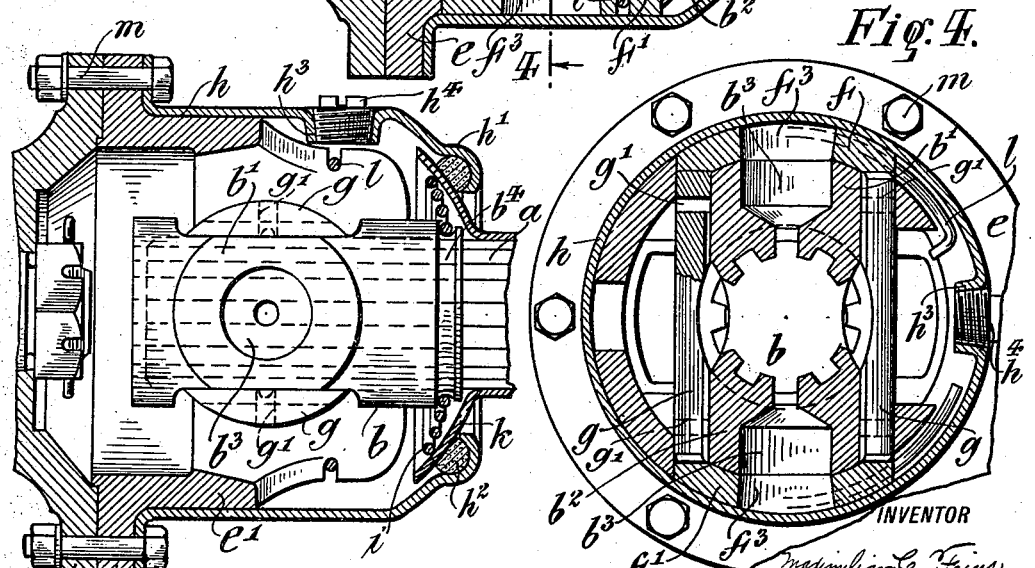

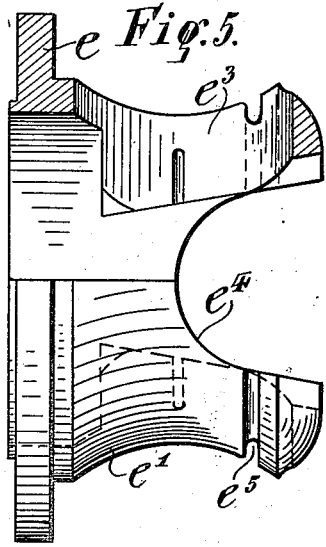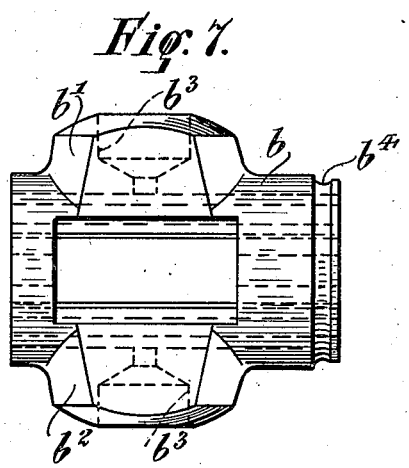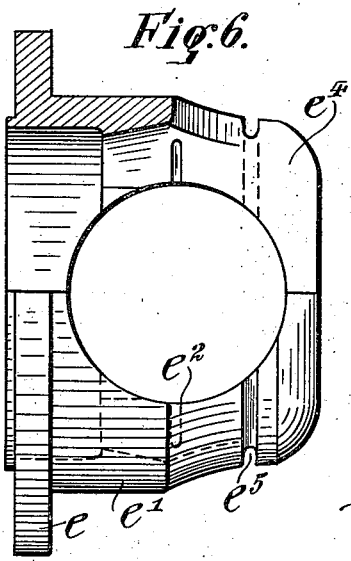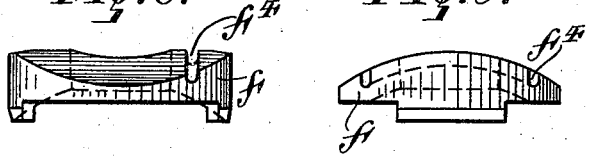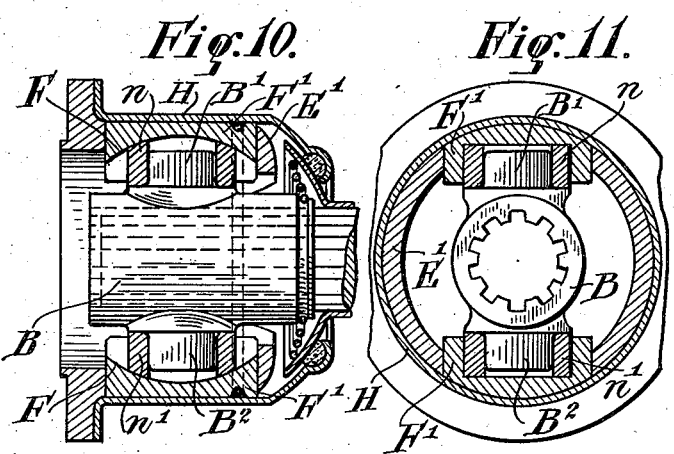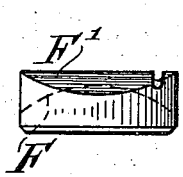

MAXIMILIAN C. FRINS, OF NEW YORK, N. Y., ASSIGNOR TO INTERNATIONAL MOTOR COMPANY, OF NEW YORK, N. Y., A CORPORATION OF DELAWARE.

UNIVERSAL JOINT.

1,413,848.   Specification of Letters Patent.   Patented Apr. 25, 1922.

Application filed May 19, 1921. Serial No. 470,793.

*To all whom it may concern:*

Be it known that I, MAXIMILIAN C. FRINS, a citizen of the United States, residing in the borough of Manhattan of the city of New York, in the State of New York, have invented certain new and useful Improvements in Universal Joints, of which the following is a specification, reference being had to the accompanying drawings, forming a part hereof.

In an application filed by the present applicant on December 6, 1920, Ser. No. 428,464, there was disclosed an improved universal joint in which positive connections between the elements were entirely eliminated and the parts retained in proper relation by a cover. The present invention relates to an improved joint which embodies the same principle but which possesses certain additional advantages gotten through an increase in the superficial area of the bearing surfaces, a reduction in the number of parts, more thorough lubrication and greater facility of assembling and disassembling. In the copending application above referred to there were employed two trunnions which were journaled in trunnion blocks, but it is believed that the elimination of trunnions journaled in trunnion blocks, as in the present invention, will give greater efficiency, reduced wear and more complete lubrication.

In accordance with the present invention a trunnion is employed, but this trunnion is not journaled in the housing of the joint but has its ends seated in caps, the interiors of which are of such shape as to permit rocking of the trunnion. The trunnions are formed with flat side faces which bear against the flat sides of segmental shoes, the exteriors of which are curved. These curved shoes bear against curved surfaces formed in the housing. By this construction the number of parts is reduced to a minimum, larger contacting areas are effected and yet the joint is housed as compactly as heretofore.

Other improvements incorporated in the improved joint and having to do with features of lubrication and cheapness of cost will appear as the detailed description of the preferred embodiments proceeds. Referring now to the drawings—

Figure 1 is an assembly view of the driving and driven ends of a shaft having associated therewith the improved joint, parts being shown in section and other parts being removed in the interest of clearness.

Figure 2 is a detailed view in longitudinal section through one of the joints shown in Figure 1.

Figure 3 is a view in longitudinal section of the joint shown in Figure 2, but taken on the plane indicated by the line 3—3 of Figure 2 and looking in the direction of the arrows.

Figure 4 is a view in transverse section of the joint shown in Figure 2 and taken along the plane indicated by the broken line 4—4 and looking in the direction of the arrows.

Figures 5 and 6 are detail views in side elevation of the improved housing taken at relative angles of 90° and a quadrant being shown in section in each figure.

Figure 7 is a detail view in elevation of the trunnion.

Figures 8 and 9 are detail views in side elevation but at relative angles of 90° of the bearing caps.

Figures 10 and 11 are views in longitudinal and transverse sections. respectively, through a somewhat modified construction.

Figures 12–16 are detail views of the caps and shoes used in the construction illustrated in Figures 10 and 11.

In Figure 1 it may be assumed, in the interest of clearness, that the tubular shaft $a$ is splined, as at $a'$, for sliding connection with a trunnion $b$ through which the driving torque is transmitted to the shaft, while the other end is keyed to a somewhat similar trunnion $c$ and locked thereto by means of a lock nut $a^2$, torque being delivered from the trunnion $c$ to the driven element. In so far as the present invention is concerned, however, there is no difference in principle between the universal joint introduced at the different ends of shafting, although, in practice it may be desirable to have the slight difference in form illustrated herein. For an understanding of the invention it will be sufficient to describe the joint through which the driving torque may be assumed to be delivered to the shaft $a$. This joint is illustrated in detail in the drawings. If the driving shaft be indicated by the reference character $d$, it will be understood that power therefrom may be delivered through the flange $d'$ fixed thereon and to which is bolted the flange $e$ of the housing $e'$, as illustrated in detail in Figures 5 and 6. Within this housing is disposed the trunnion $b$. This trunnion has itself two diametrically extending ends $b'$, $b^2$ beveled or formed of generally spherical outline for engagement with end caps $f$, $f'$, respectively, which are carried in diametrical openings $e^2$, $e^3$, respectively, formed in the housing $e'$. The inner surfaces of the caps $f$, $f'$, are of generally similar outline to the ends $b'$, $b^2$ of the trunnion $b$. Their exterior surfaces are curved, as shown in Figure 2, to conform to the curvature of the exterior of the housing $e'$. The caps $f$, $f'$ do not actually support the trunnion $b$, but the ends of the trunnion $b$ do bear on said caps and move freely therein with universal movement. The caps hold the trunnion against axial movement.

The opposite sides of the trunnion extending between the diametrical ends $b'$, $b^2$ are machined flat, as indicated in Figure 4. Against these flat sides bear the flat sides of the segmental shoes $g$. The exteriors of these shoes $g$ are curved and bear against the curved openings $e^2$, $e^3$, formed in the housing $e'$. The ends of the shoes $g$ may rest against the opposite caps $f$, $f'$ in order to keep them properly positioned and hold them against longitudinal displacement.

All of the parts are maintained in proper relation and the trunnion held against axial movement by means of a cylindrical cover $h$ which may be bolted to the flange $e$ and may have its end $h'$ formed in generally spherical shape and provided with a packing $h^2$. The cover $h$ is adapted to embrace the exterior wall of the housing $e'$ with some degree of snugness and since the exterior edge of the bearing caps $f$, $f'$ conforms to the curvature of the housing, they will also be embraced by the cover.

Much attention has been given to the problem of lubrication in the improved construction in order that all of the bearing and wearing parts might be constantly lubricated. On the end of the trunnion there is seated a spiral spring $i$ which presses against a hollow retainer $k$ which conforms generally to the end $h'$ of the cover $h$ and rests within it so as to be pressed by the spring $i$ against the packing $h^2$. The lubricant is introduced through a drawn channel $h^3$ adapted to be closed by a suitable plug $h^4$. Incidentally the drawn channel $h^3$ has the mechanical function of positioning the cover in proper relation to the housing since its length is such that it must be placed between the scalloped ends $e^4$. The caps $f$, $f'$ are formed with ducts $f^3$, which communicate, respectively, with ducts $b^3$ extending through the diametrical ends $b'$, $b^2$ of the trunnion $b$. The ducts $b^3$ open in line with the splines $a'$, so that free circulation of the lubricant thereover is afforded. In order that the flat sides of the trunnion $b$ may likewise be lubricated the shoes $g$ are formed with ports $g'$ through which the lubricant may circulate.

The parts of the joint are of the utmost simplicity and cost little in manufacture. They may be assembled with ease. In assembling the trunnion $b$ is passed through the open end of the housing $e'$. The shaft $a$ is placed in engagement therewith. The spring $i$ and hollow retainer $k$ are slipped into place, the spring $i$ being centered in a groove $b^4$ in the trunnion. The shoes $g$ may be slid in place laterally through the side openings $e^2$, $e^3$ in the housing $e'$ with their flat faces bearing against the opposite flat walls of the trunnion $b$. The bearing caps $f$, $f'$ are then placed in the openings $e^2$, $e^3$ with their exteriors conforming to the outer wall of the housing $e'$. A retaining spring $l$ may be snapped into a groove $e^5$ in the outer wall of the housing and into alined grooves $f^4$ in the outer faces of the caps $f'$, $f$. With the parts in this relation the cover $h$ may be slid along against the hollow retainer $k$ and against the action of the spring $i$ and finally bolted to the flange $e$ of the housing, common bolts $m$ serving, if desired, to secure the cover in place and at the same time to secure the flange $e$ to the driving flange $d'$. Angular movement of the shaft $a$ with relation to the shaft $d$, in one plane, is effected by the rocking of the exterior curved surfaces of the segmental shoes $g$ on the curved walls of the openings $e^2$, $e^3$ in the housing $e'$. Angular movement of the shaft $a$ in a plane at right angles to the first described movement is to permit all sliding movement of the flat side faces of the trunnion $b$ on the flat faces of the shoes $g$. Movement of the trunnion in either plane or in any plane compounded of the first two is facilitated by the spherical seats in the caps $f$, $f'$ for the ends $b'$, $b^2$ of the trunnion and radial movement of the trunnion with relation to its axis and of the caps $f$, $f'$ is positively prevented by the cover $h$.

The construction described while retaining the most desirable features of the joint shown in the aforementioned application is believed to have certain advantages thereover in that the bearing and wearing surfaces have been greatly increased in area, the number of parts reduced and the lubrication improved. The use of shoes enables very large bearing areas to be secured without imposing the wear on the trunnion itself and the shoes also have been so constructed and disposed as to take the greater portion of the wear on their flat faces. Their replacement is, of course, an inexpensive and simple operation.

The modified construction, as illustrated in Figures 10–16, while embodying many of the advantageous features of the form above described, may not be as efficient in all situations because of the employment of supporting trunnions. As shown in Figures 10 and 11, the trunnion piece B has opposed trunnions B′, B² which bear in trunnion blocks n, n′ respectively. Each of these trunnion blocks is generally rectangular in plan, as shown in Figure 16, but has its outer end curved, as shown in Figure 14, to engage slidably a curved seat F in a bearing cap F′ supported in the housing E′, as heretofore described. The cover H holds each bearing cap F′ against radial movement. Angular movement of the trunnion piece B in one plane is had about the axis of the trunnions B′, B², while angular movement in a plane at right angles thereto is had by planetary movement of the blocks n, n′ on their curved seats in the respective bearing caps F′. All of the other elements of the joint may be constructed and arranged as before described.

Changes in detail, such as have to do with form and dimensions, and details within the skill of a mechanic may be made without departing from tne spirit of the invention, provided the alterations fall within the scope of the appended claims.

I claim as my invention:

1. A universal joint comprising a housing having independent diametrically opposed bearing caps supported therein and formed with curved seats on their inner faces, trunnions mounted within the housing and having curved ends oppositely extended at right angles to the axis of rotation and operatively seated on the curved bearing seats of said caps, and a cover to hold the caps against axial movement along lines coincident with the axes of said trunnions.

2. A universal joint comprising a housing, independent diametrically opposed bearing caps supported in the housing and having their inner faces formed with curved seats, trunnions having diametrical ends seated for universal movement in and relatively to the opposed bearing caps, said trunnions being formed with opposed flat sides, and independent segmental shoes having flat sides in engagement with the opposed flat sides of the trunnions for relative movement therebetween in one plane and their curved exterior sides journaled rotatably in the housing for rotative movement with the trunnions in another plane.

3. A universal joint comprising a housing, independent diametrically opposed bearing caps supported in the housing, trunnions having diametrical curved ends seated for universal movement in the opposed bearing caps, said trunnions being formed with opposed flat sides, independent segmental shoes having flat sides in engagement with the opposed flat sides of the trunnions for relative movement therebetween in one plane and their curved exterior sides journaled rotatably in the housing for rotative movement with the trunnions in another plane, and a cover to hold the bearing caps against axial movement.

4. A universal joint comprising a housing, independent diametrically opposed bearing caps supported in the housing and having spherical seats, on their faces trunnions having diametrical ends of spherical form seated in the spherical seats for universal movement in the opposed bearing caps, said trunnions being formed with opposed flat sides, and independent segmental shoes having flat sides in engagement with the opposed flat sides of the trunnions for relative movement therebetween in one plane and their curved exterior sides journaled rotatably in the housing.

5. A universal joint comprising a circular housing having curved openings therein at diametrically opposite points, independent bearing caps fitted snugly within said openings and conforming exteriorly to the outline of the housing and having curved inner faces, trunnions within the housing and having diametrical curved ends seated in the respective inner faces of the caps for universal movement, said trunnion having two of their opposite sides flat, independent segmental shoes having flat surfaces against which the flat sides of the trunnion bear for relative movement in one plane and having exteriorly curved surfaces resting in the curved openings in the housing for rotative movement in another plane, and means exteriorly of the caps to hold them against axial movement.

6. A universal joint comprising a circular housing having curved openings therein at diametrically opposite points, independent bearing caps fitted snugly within said openings and conforming exteriorly to the outline of the housing and having their inner faces curved, means to hold the caps against rotative movement, trunnions within the housing and having diametrical curved ends seated in the respective caps for universal movement, said trunnions having two of their opposite sides flat, independent segmental shoes having flat surfaces against which the flat sides of the trunnion bear for relative movement therebetween in one plane and having exteriorly curved surfaces resting in the curved openings in the housing for rotative movement in another plane, and a cover to hold the caps against axial movement.

7. A universal joint comprising a housing having openings therein at diametrically opposite points, independent bearing caps supported in the openings and having curved inner faces, trunnions having diametrical ends seated in the curved faces of the caps, the trunnions being formed on opposite side walls with flat surfaces, and independent segmental shoes having flat surfaces on which the flat surfaces of the trunnion rest and exteriorly curved surfaces bearing against the openings in the housing for rotative movement with the trunnions, said trunnion ends and bearing caps having through communicating ports for a lubricant.

8. A universal joint comprising a housing having openings therein at diametrically opposite points, independent bearing caps supported in the openings formed with curved inner faces, trunnions having diametrical curved ends seated in the curved inner faces of the caps, the trunnions being formed on opposite side walls with flat surfaces, independent segmental shoes having flat surfaces on which the flat surfaces of the trunnion rest for relative movement between the shoes and trunnions and exteriorly curved surfaces bearing against the openings in the housing, and a cover embracing the bearing caps and holding them against axial movement, said trunnion ends and bearing caps having through communicating ports for a lubricant.

This specification signed the 13 day of May, A. D., 1921.

MAXIMILIAN C. FRINS.